(12) United States Patent
Cuppari et al.

(10) Patent No.: US 10,384,925 B2
(45) Date of Patent: Aug. 20, 2019

(54) DYNAMICALLY ADJUSTING RATIOS OF BEVERAGES IN A MIXED BEVERAGE

(71) Applicant: The Coca-Cola Company, Atlanta, GA (US)

(72) Inventors: Scott Cuppari, Smyrna, GA (US); Michael Edmond Boutte', Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 211 days.

(21) Appl. No.: 14/453,815

(22) Filed: Aug. 7, 2014

(65) Prior Publication Data

US 2015/0046877 A1    Feb. 12, 2015

Related U.S. Application Data

(60) Provisional application No. 61/863,269, filed on Aug. 7, 2013.

(51) Int. Cl.
*B67D 1/00* (2006.01)
*B67D 1/08* (2006.01)
(Continued)

(52) U.S. Cl.
CPC .......... *B67D 1/0888* (2013.01); *B67D 1/0015* (2013.01); *G06F 3/0488* (2013.01);
(Continued)

(58) Field of Classification Search
CPC .... G06F 3/017; G06F 3/048482; G06F 3/048; G06F 17/30554; G06F 3/14;
(Continued)

(56) References Cited

U.S. PATENT DOCUMENTS 5,036,892 A * 8/1991 Stembridge ........... B06B 1/0681
141/1
5,192,000 A * 3/1993 Wandrick ............. B67D 1/0037
222/129.3
(Continued)

FOREIGN PATENT DOCUMENTS

MX     2010 002 290 A    4/2010
WO     2011/072938 A1    6/2011

OTHER PUBLICATIONS

International Search Report dated Dec. 2, 2014 cited in Application No. PCT/US2014/050196, 11 pgs.
(Continued)

*Primary Examiner* — Ryan F Pitaro
*Assistant Examiner* — Carl P Lobo

(57) ABSTRACT

The dynamic adjustment of ratios of beverages to be mixed and dispensed in creating mixed or blended beverages is provided. A selection of beverages may be received from a user interface menu displayed by a computing device. A representation of a mixed beverage comprising the beverage selections may then be displayed according to pre-assigned default ratios. An input may then be received to adjust an assigned ratio associated with one or more of the beverage selections. The computing device may then adjust an assigned ratio associated with the one or more beverage selections in response to receiving the input. The computing device may then automatically adjust assigned ratios associated with other beverage selections in the representation of the mixed beverage. The computing device may then display a representation of the mixed beverage with the adjusted ratios in the user interface.

35 Claims, 13 Drawing Sheets

(51) Int. Cl.
*G06Q 20/32* (2012.01)
*G07F 13/06* (2006.01)
*G06F 3/0481* (2013.01)
*G06F 3/0484* (2013.01)
*G06F 3/0488* (2013.01)

(52) U.S. Cl.
CPC ...... *G06F 3/04817* (2013.01); *G06F 3/04842* (2013.01); *G06F 3/04845* (2013.01); *G06F 3/04847* (2013.01); *G06Q 20/322* (2013.01); *G07F 13/065* (2013.01)

(58) Field of Classification Search
CPC .. G06F 19/704; G06F 1/3265; G06F 3/04817; G06F 3/0482; G06F 3/0484; G06F 3/04842; G06F 19/00; G06F 19/3462; G06F 3/04845; G06F 3/04847; G06F 3/0485; G06F 17/15; G06F 3/04848; Y10T 436/2575; B67D 1/0888; B67D 1/1204; B67D 1/0884; B67D 2210/00123; B67D 3/0051; B67D 1/0016
See application file for complete search history.

(56) References Cited

U.S. PATENT DOCUMENTS

| | | | | |
|---|---|---|---|---|
| 6,992,590 B1* | 1/2006 | Tietsworth | ........... | B67D 1/0032 340/539.22 |
| 8,280,775 B2* | 10/2012 | Armstrong | ........... | G06Q 20/204 705/15 |
| 8,757,222 B2* | 6/2014 | Rudick | ........... | B67D 1/0888 141/198 |
| 8,910,674 B2* | 12/2014 | Segiet | ........... | B67D 1/0888 141/198 |
| 9,334,150 B1* | 5/2016 | Ost | ........... | B67D 1/1236 |
| 9,443,373 B2* | 9/2016 | Delbreil | ........... | G07F 9/026 |
| 9,865,023 B2* | 1/2018 | Insolia | ........... | G06Q 30/0601 |
| 2003/0071087 A1* | 4/2003 | Jedlicka | ........... | B01F 5/0413 222/527 |
| 2005/0178144 A1* | 8/2005 | Crisp, III | ........... | B67D 1/0057 62/389 |
| 2006/0188620 A1* | 8/2006 | Gutwein | ........... | A23F 5/243 426/433 |
| 2007/0026869 A1* | 2/2007 | Dunko | ........... | G06F 1/1613 455/456.1 |
| 2007/0191983 A1* | 8/2007 | Griffits | ........... | A47G 19/2227 700/213 |
| 2008/0004973 A1* | 1/2008 | Rothschild | ........... | B67D 1/0041 705/14.46 |
| 2008/0128458 A1* | 6/2008 | Njaastad | ........... | F25C 5/187 222/639 |
| 2008/0262648 A1* | 10/2008 | Kriston | ........... | G06Q 30/02 700/233 |
| 2008/0309677 A1* | 12/2008 | Fleury | ........... | G06F 3/04847 345/630 |
| 2009/0045256 A1* | 2/2009 | McInerney | ........... | B67D 1/0888 235/381 |
| 2009/0065520 A1* | 3/2009 | Peters | ........... | B67D 1/0041 221/1 |
| 2009/0065529 A1* | 3/2009 | Guadalupi | ........... | B67D 1/0021 222/129.1 |
| 2009/0070234 A1* | 3/2009 | Peters | ........... | B67D 1/0041 705/26.1 |
| 2009/0083327 A1* | 3/2009 | Ringham | ........... | G06Q 10/10 |
| 2009/0259556 A1* | 10/2009 | Carroll | ........... | G06Q 20/20 705/17 |
| 2009/0280860 A1* | 11/2009 | Dahlke | ........... | G06F 3/016 455/556.1 |
| 2009/0284463 A1* | 11/2009 | Morimoto | ........... | G06F 1/1616 345/156 |
| 2010/0125362 A1* | 5/2010 | Canora | ........... | G06Q 20/3278 700/236 |
| 2010/0125816 A1* | 5/2010 | Bezos | ........... | G06F 1/1626 715/863 |
| 2010/0153201 A1* | 6/2010 | De Rubertis | ........... | G06Q 30/02 705/14.19 |
| 2010/0198643 A1* | 8/2010 | Friedman | ........... | G06Q 30/0241 705/14.4 |
| 2010/0214216 A1* | 8/2010 | Nasiri | ........... | A63F 13/06 345/158 |
| 2010/0268378 A1* | 10/2010 | Sharpley | ........... | A47J 31/52 700/233 |
| 2011/0017776 A1* | 1/2011 | Metropulos | ........... | B67D 1/0041 222/129.1 |
| 2011/0044262 A1* | 2/2011 | Satapathy | ........... | H04L 47/14 370/329 |
| 2011/0123688 A1* | 5/2011 | Deo | ........... | B67D 1/0027 426/231 |
| 2011/0146328 A1* | 6/2011 | Hendrickson | ........... | F25D 29/00 62/389 |
| 2011/0146819 A1* | 6/2011 | Hendrickson | ........... | F25D 29/00 137/561 R |
| 2011/0148651 A1* | 6/2011 | Hendrickson | ........... | D06F 39/02 340/686.6 |
| 2011/0153871 A1* | 6/2011 | Ferragut, II | ........... | F24C 7/082 710/8 |
| 2011/0168290 A1* | 7/2011 | Breitenbach | ........... | G06Q 10/06311 141/1 |
| 2011/0168775 A1* | 7/2011 | Van Zetten | ........... | B67D 1/0888 235/381 |
| 2011/0184812 A1* | 7/2011 | Stoulil | ........... | G06Q 30/02 705/14.66 |
| 2012/0017147 A1* | 1/2012 | Mark | ........... | G06F 1/1639 715/702 |
| 2012/0035761 A1* | 2/2012 | Tilton | ........... | G07F 13/065 700/233 |
| 2012/0059741 A1* | 3/2012 | Khan | ........... | G06Q 30/06 705/27.1 |
| 2012/0095882 A1* | 4/2012 | Wolff | ........... | G06Q 30/0643 705/27.2 |
| 2012/0110517 A1 | 5/2012 | Sparks et al. | | |
| 2012/0123588 A1* | 5/2012 | Cloran | ........... | G06Q 30/02 700/233 |
| 2012/0154294 A1* | 6/2012 | Hinckley | ........... | G06F 1/1649 345/173 |
| 2012/0221290 A1* | 8/2012 | Oka | ........... | G06F 15/00 702/141 |
| 2012/0285986 A1* | 11/2012 | Irvin | ........... | B67D 1/0041 222/1 |
| 2013/0035139 A1* | 2/2013 | Sheynblat | ........... | G06F 1/1626 455/566 |
| 2013/0037565 A1* | 2/2013 | Newman | ........... | B67D 1/0021 222/1 |
| 2013/0041761 A1* | 2/2013 | Voda | ........... | G06Q 30/0259 705/14.68 |
| 2013/0062366 A1* | 3/2013 | Tansey | ........... | A47J 31/44 222/102 |
| 2013/0074614 A1* | 3/2013 | Holmes | ........... | B01L 3/50825 73/864.01 |
| 2013/0085600 A1* | 4/2013 | Nicol | ........... | G06Q 30/06 700/236 |
| 2013/0096715 A1* | 4/2013 | Chung | ........... | G06Q 20/32 700/233 |
| 2013/0104071 A1* | 4/2013 | Boutoussov | ........... | G06F 19/3406 715/781 |
| 2013/0106690 A1* | 5/2013 | Lim | ........... | G07F 13/065 345/156 |
| 2013/0111579 A1* | 5/2013 | Newman | ........... | G06F 3/0488 726/17 |
| 2013/0154952 A1* | 6/2013 | Hinckley | ........... | G06F 1/1694 345/173 |
| 2014/0188271 A1* | 7/2014 | Hernandez | ........... | B67D 1/0888 700/232 |
| 2014/0332289 A1* | 11/2014 | Gallagher, Jr. | ........... | G01G 19/414 177/1 |
| 2015/0144653 A1* | 5/2015 | Kline | ........... | B67D 1/0888 222/1 |

(56) References Cited

U.S. PATENT DOCUMENTS

2016/0052770 A1\* 2/2016 Ratti .................. B25J 11/008
                                                    705/15
2016/0368753 A1\* 12/2016 Bethuy ............... B67D 1/0025
2017/0293983 A1\* 10/2017 Long, II ............. G06Q 50/12
2018/0072553 A1\* 3/2018 Lyons .................. A45F 3/18

OTHER PUBLICATIONS

Anonymous; Welcome: Top Shelf—The iPhone Cocktail Reference; Jul. 28, 2013; Retrieved from the Internet: URL: https://web.archive.org/web/20130728122501/http://www.drinksapp.com. [retrieved on Nov. 5, 2014], 4 pgs.

\* cited by examiner

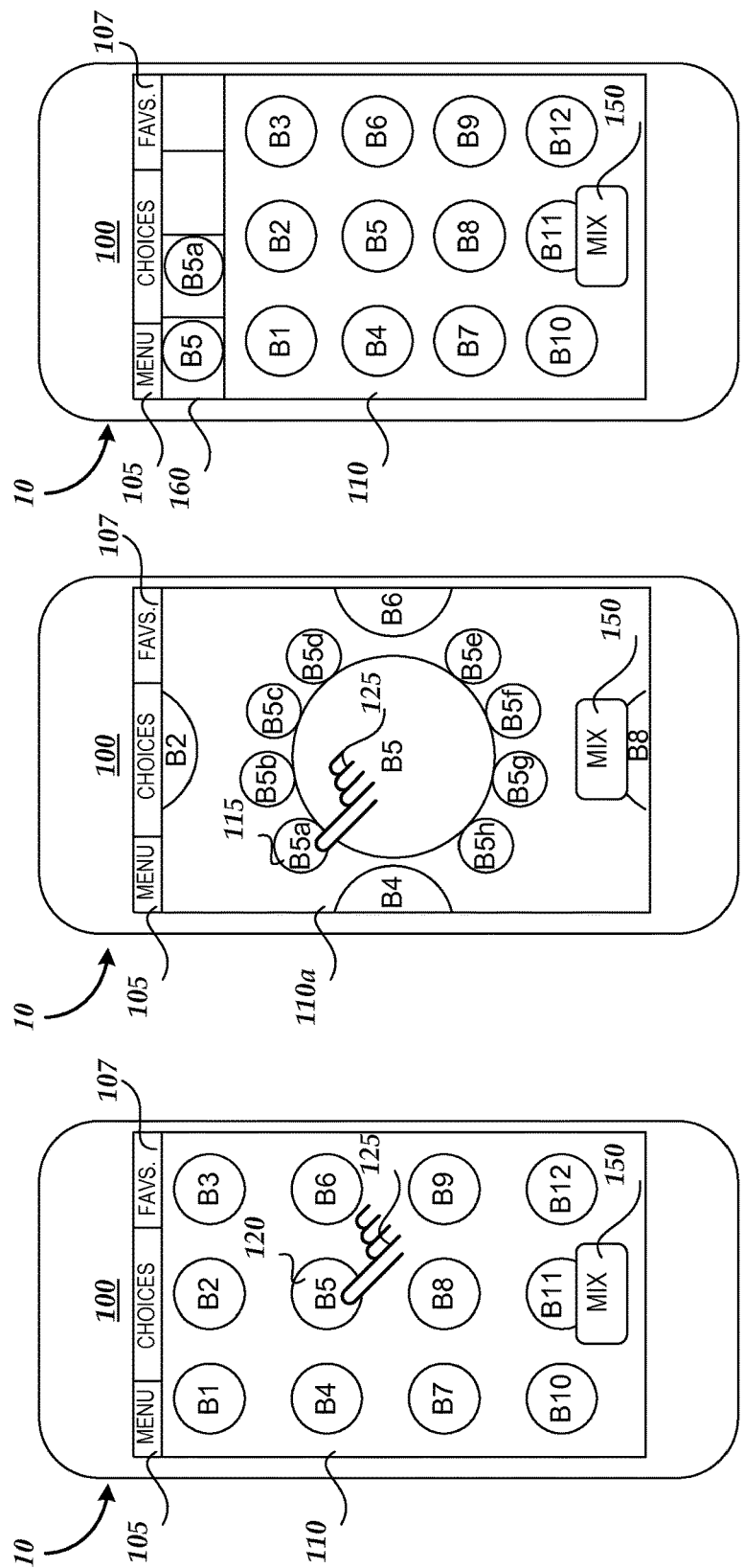

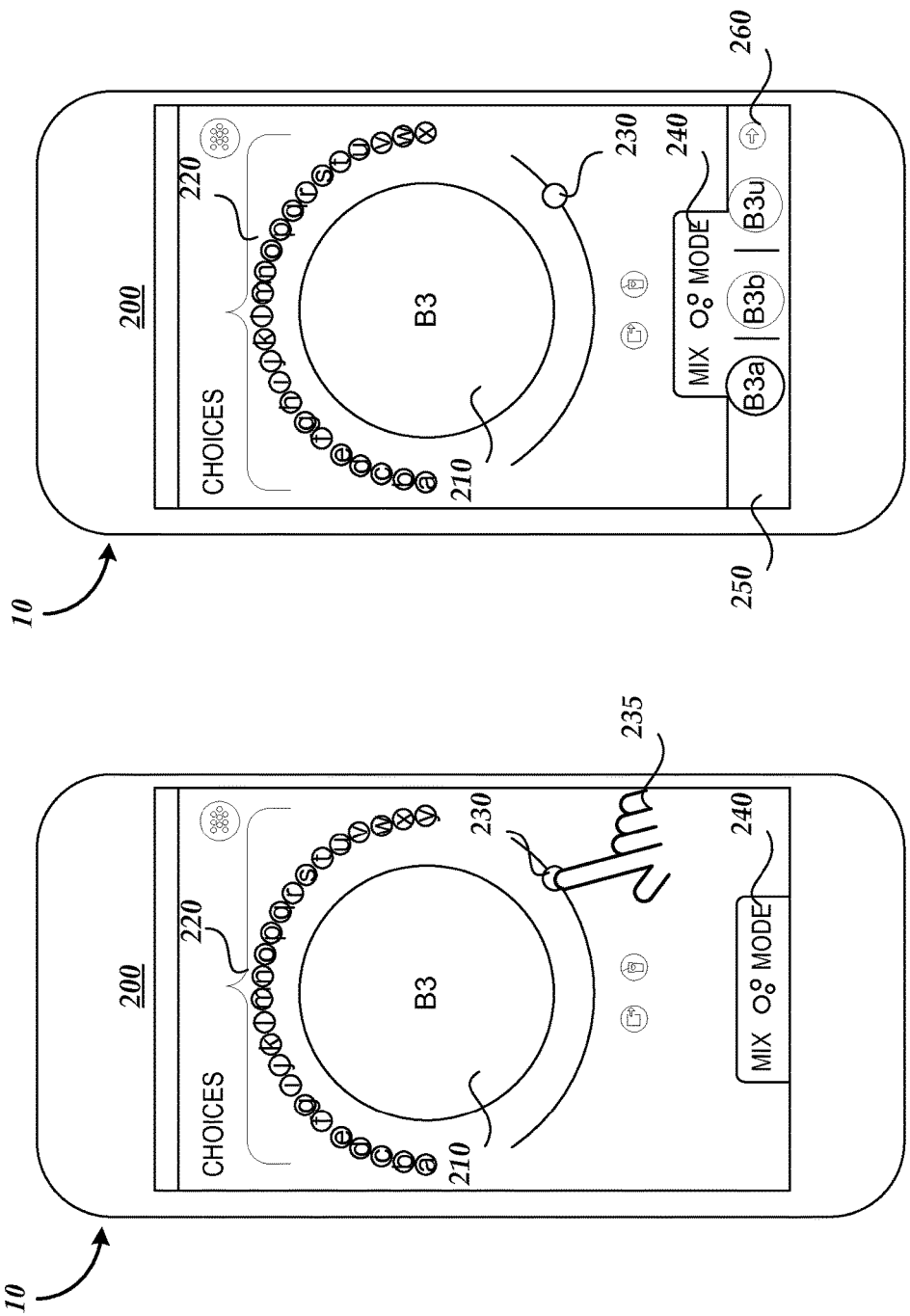

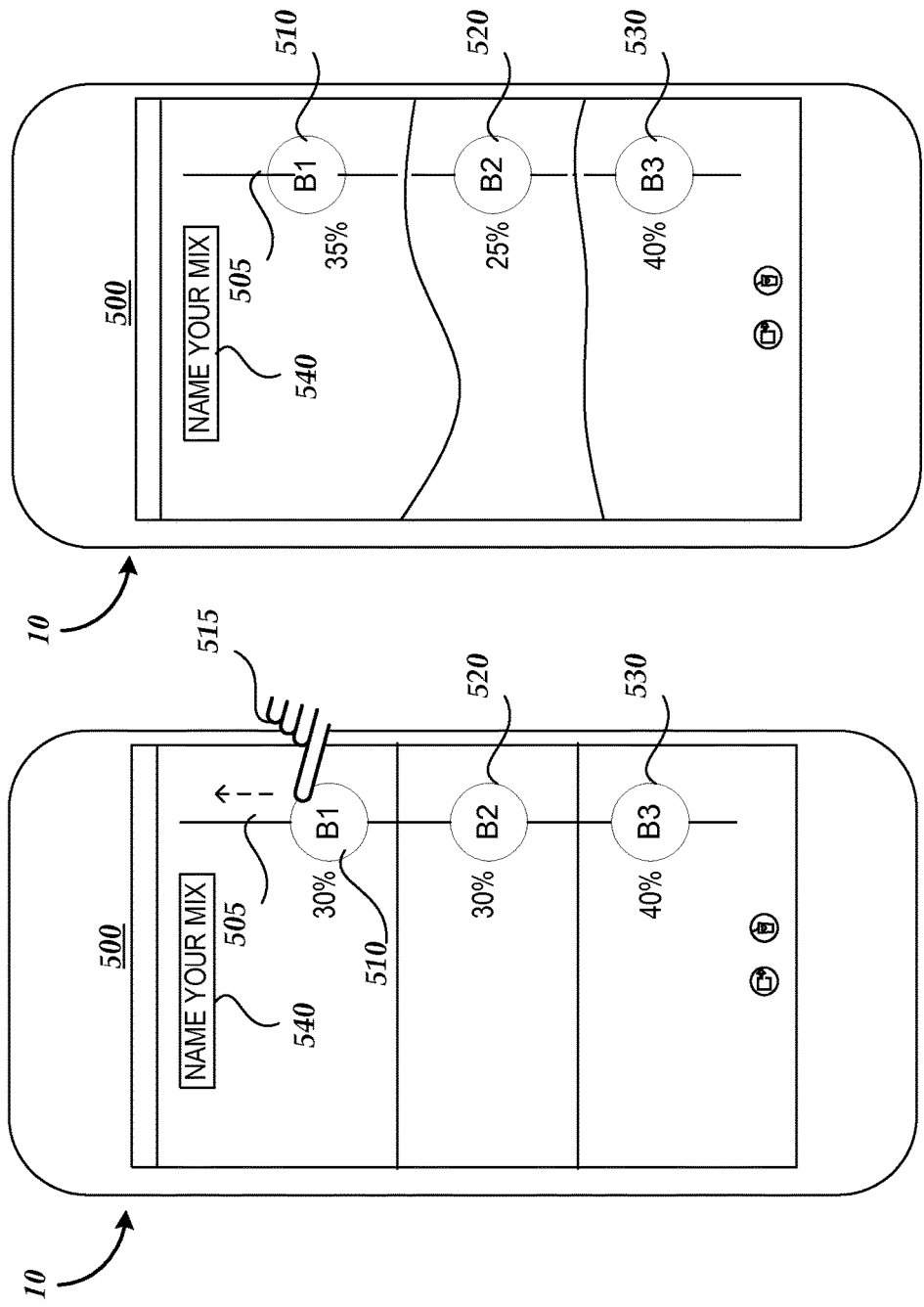

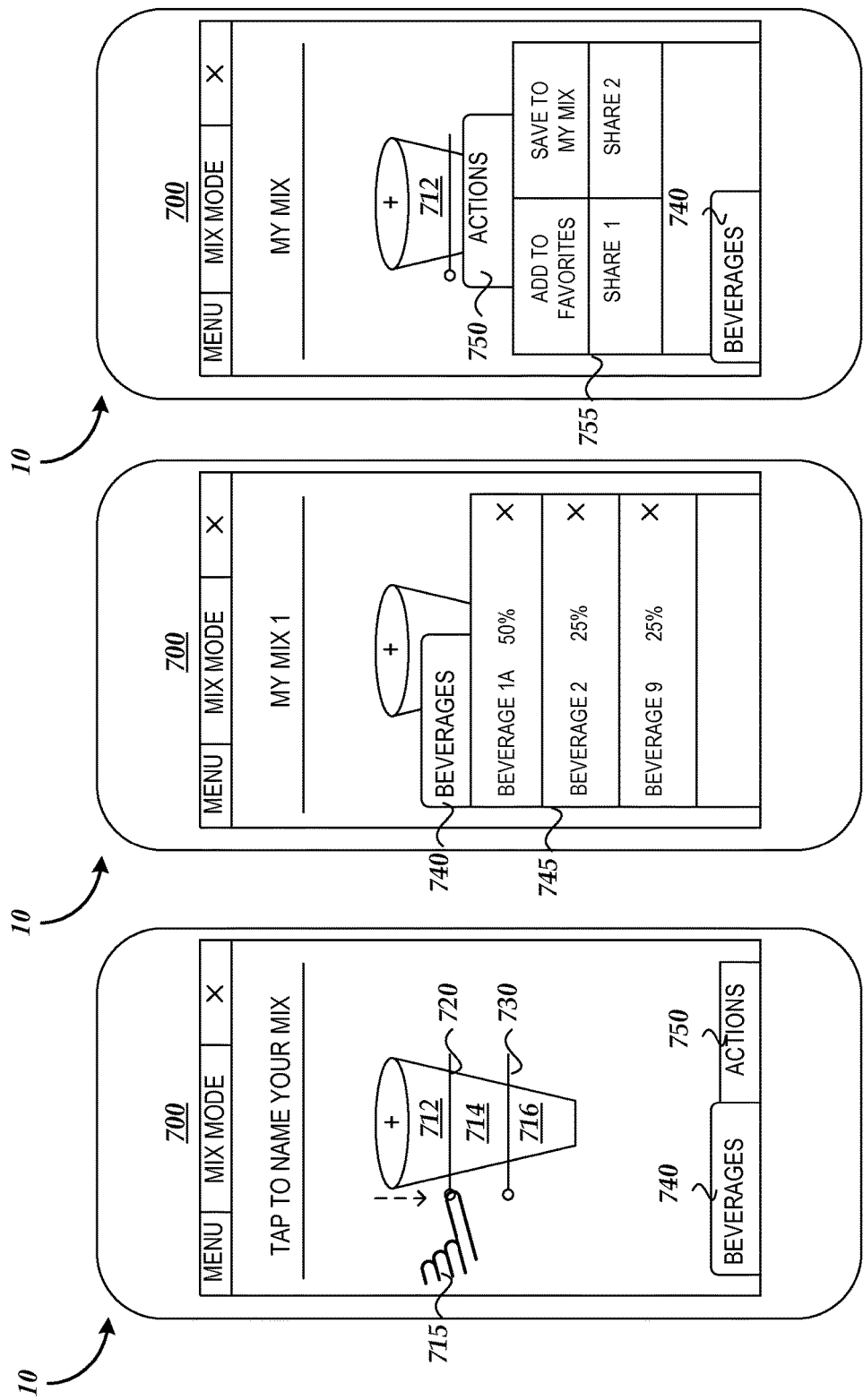

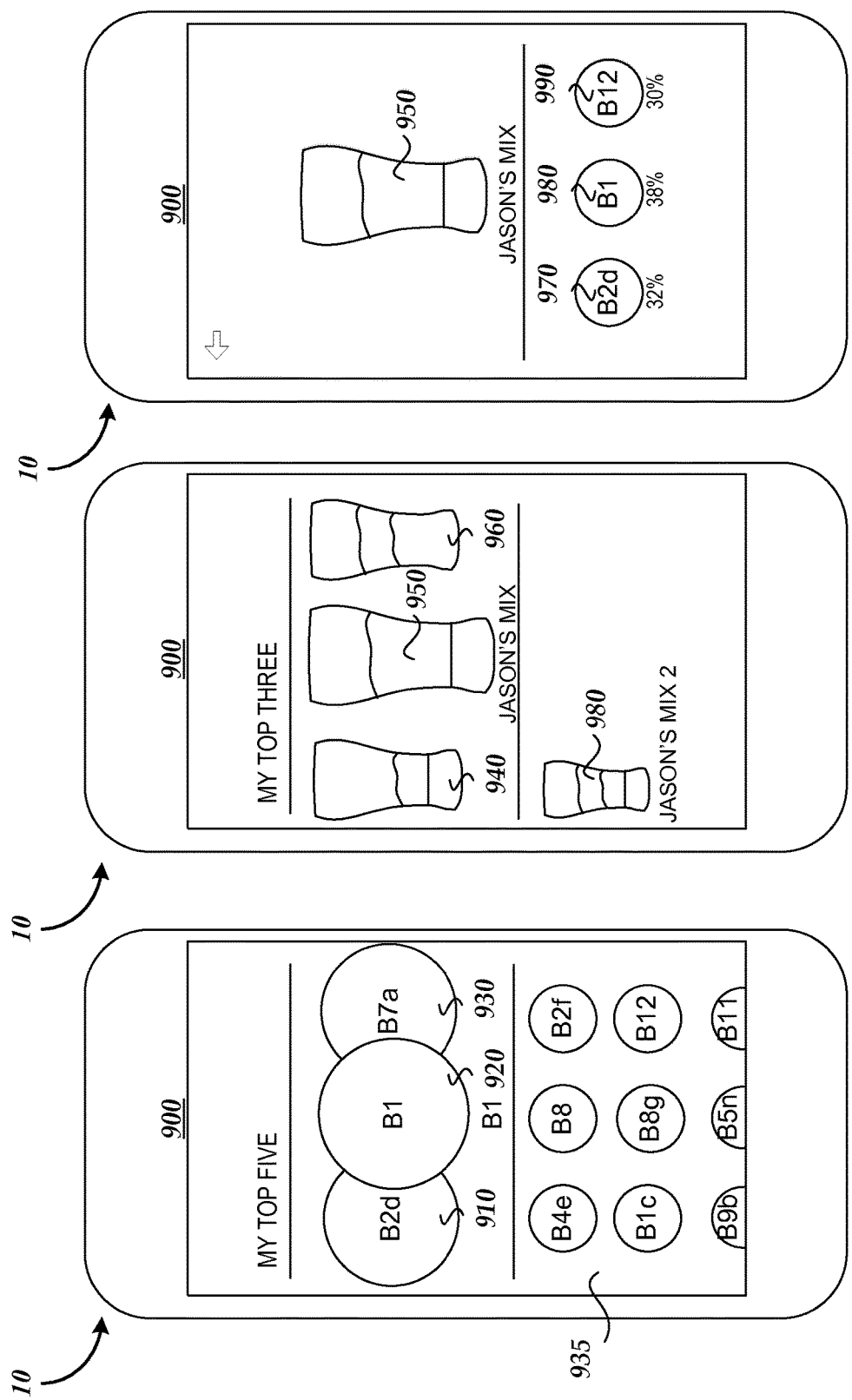

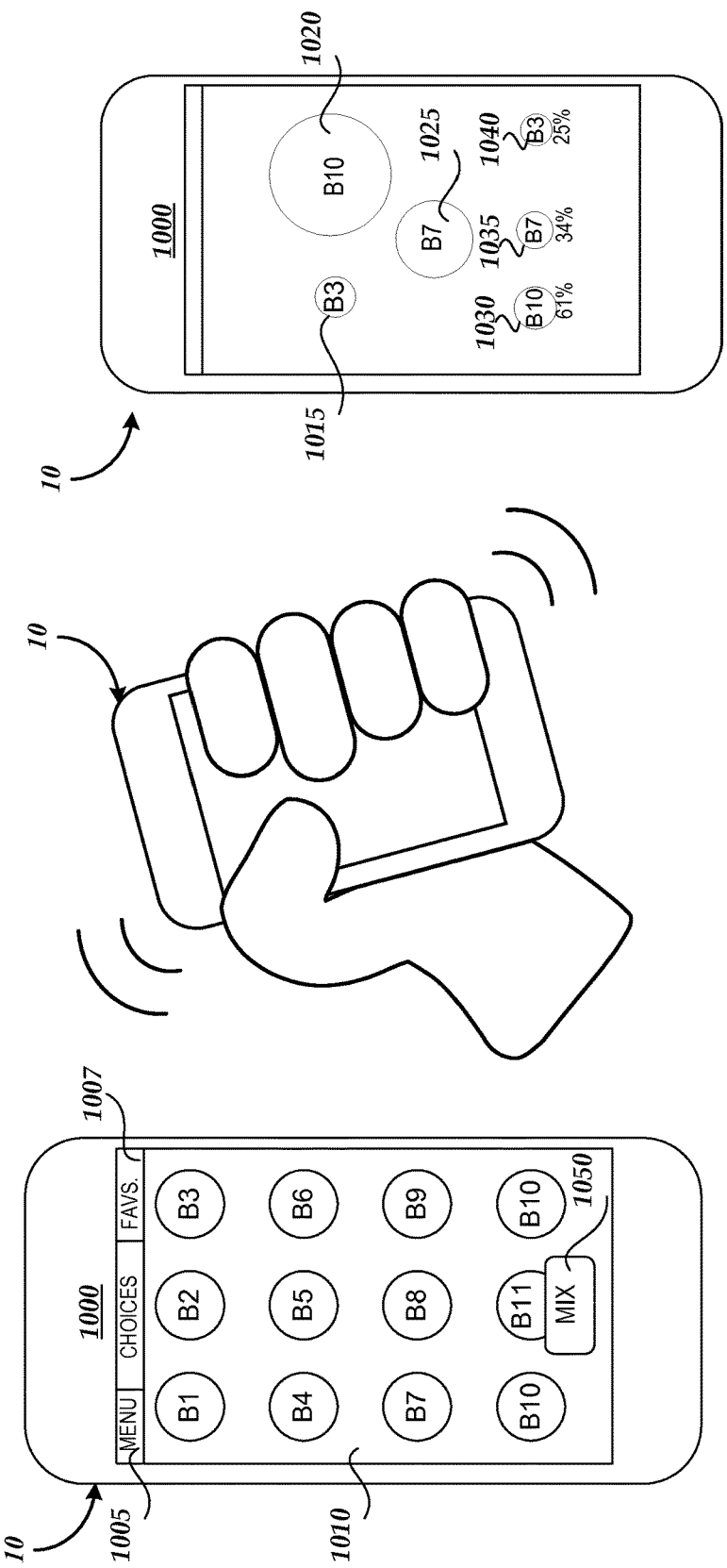

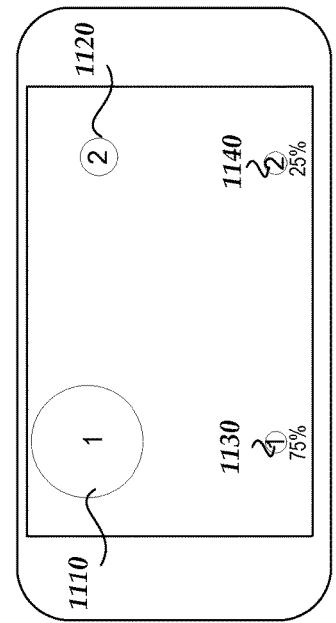
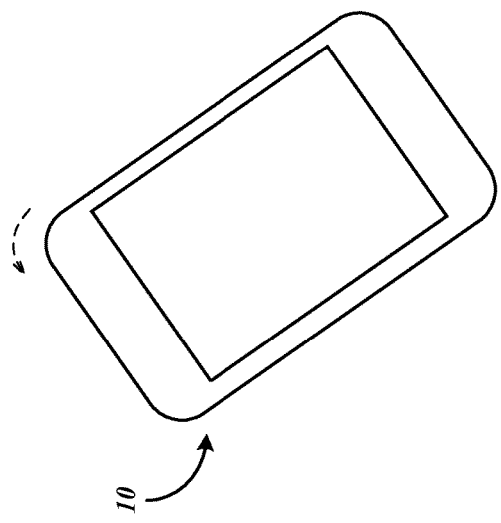
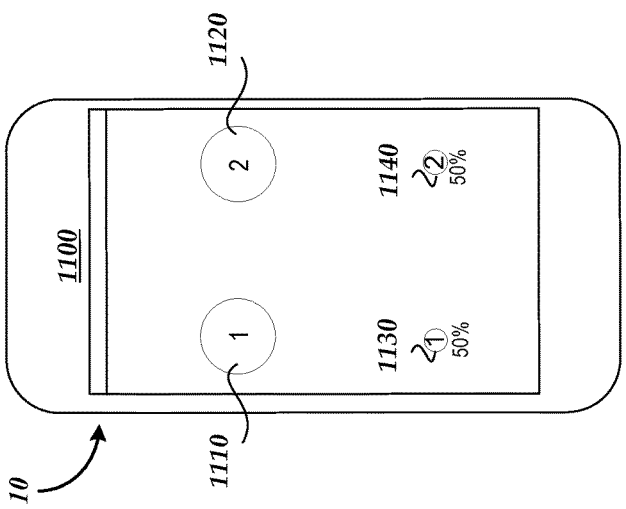
FIG. 11B
FIG. 11C
FIG. 11A

DYNAMICALLY ADJUSTING RATIOS OF BEVERAGES IN A MIXED BEVERAGE

CROSS-REFERENCE TO RELATED APPLICATIONS

This patent application claims priority to U.S. Patent Application Ser. No. 61/863,269, filed Aug. 7, 2013, entitled "Dynamically Adjusting Ratios of Beverages in a Mixed Beverage," of which the disclosure is incorporated herein, in its entirety, by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Today, many consumers enjoy creating custom beverages by manually dispensing various branded beverages in desired ratios in a single container. The above however, suffers from drawbacks in that consumers have no way of determining the exact ratios needed in order to replicate the creation of a custom beverage (i.e., the consumer is forced to "guestimate" or "eyeball" the beverages as they are dispensed). As a result, consumers attempting to manually create custom beverages may receive a different ratio of branded beverages each time a drink is dispensed thereby leading to decreased drink consistency. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for dynamically adjusting ratios of beverages to be mixed and dispensed in the creation of mixed or blended beverages. A selection of beverages may be received from a user interface menu displayed by a computing device. A representation of a mixed beverage comprising the beverage selections may then be displayed according to pre-assigned default ratios. An input may then be received in a user interface to adjust an assigned ratio associated with one or more of the beverage selections. The computing device may then adjust an assigned ratio associated with the one or more beverage selections in response to receiving the input. The computing device may then automatically adjust assigned ratios associated with other beverage selections in the representation of the mixed beverage. The computing device may then display a representation of the mixed beverage with the adjusted ratios in the user interface. These and other features and advantages will be apparent from a reading of the following detailed description and a review of the associated drawings. It is to be understood that both the foregoing general description and the following detailed description are illustrative only and are not restrictive of the invention as claimed.

BRIEF DESCRIPTION OF THE DRAWINGS

FIG. 1A is a computing device screen display of a user interface which may be utilized for selecting beverages for mixing, in accordance with an embodiment;

FIG. 1B is a computing device screen display of a user interface which may be utilized for selecting beverages for mixing, in accordance with an embodiment;

FIG. 1C is a computing device screen display of a user interface which may be utilized for selecting beverages for mixing, in accordance with an embodiment;

FIG. 2A is a computing device screen display of a user interface which may be utilized for selecting beverages for mixing, in accordance with an alternative embodiment;

FIG. 2B is a computing device screen display of a user interface which may be utilized for selecting beverages for mixing, in accordance with an alternative embodiment;

FIG. 5A is a computing device screen display of a user interface which may be utilized for dynamically adjusting ratios of beverages within a mixed beverage, in accordance with another alternative embodiment;

FIG. 5B is a computing device screen display of a user interface which may be utilized for dynamically adjusting ratios of beverages within a mixed beverage, in accordance with another alternative embodiment;

FIG. 7A is a computing device screen display of a user interface which may be utilized for dynamically adjusting ratios of beverages within a mixed beverage, in accordance with yet another alternative embodiment;

FIG. 7B is a computing device screen display of a user interface which may be utilized for dynamically adjusting ratios of beverages within a mixed beverage, in accordance with yet another alternative embodiment;

FIG. 7C is a computing device screen display of a user interface which may be utilized for dynamically adjusting ratios of beverages within a mixed beverage, in accordance with yet another alternative embodiment;

FIG. 9A is a computing device screen display of a user interface which may be utilized for saving favorite beverages, in accordance with an embodiment;

FIG. 9B is a computing device screen display of a user interface which may be utilized for saving favorite mixes created by dynamically adjusting ratios of beverages within mixed beverages, in accordance with an embodiment;

FIG. 9C is a computing device screen display of a user interface which may be utilized for displaying ratios in a saved favorite mixed beverage, in accordance with an embodiment;

FIG. 10A is a computing device screen display of a user interface which may be utilized for randomly selecting beverages for mixing and randomly adjusting beverage ratios, in accordance with an embodiment;

FIG. 10B shows an agitation input for randomly selecting beverages for mixing and randomly adjusting beverage ratios, in accordance with an embodiment;

FIG. 10C is a computing device screen display of a user interface which may be utilized for displaying randomly selecting beverages and beverage mix ratios for a mixed beverage, in accordance with an embodiment;

FIG. 11A is a computing device screen display of a user interface which may be utilized for randomly adjusting ratios of beverages within a mixed beverage, in accordance with an embodiment;

FIG. 11B shows a tilt input for randomly adjusting ratios of beverages within a mixed beverage, in accordance with an embodiment;

FIG. 11C is a computing device screen display of a user interface which may be utilized for displaying randomly adjusted ratios of beverages within a mixed beverage, in accordance with an embodiment;

DETAILED DESCRIPTION

Figures 3A, 3B:
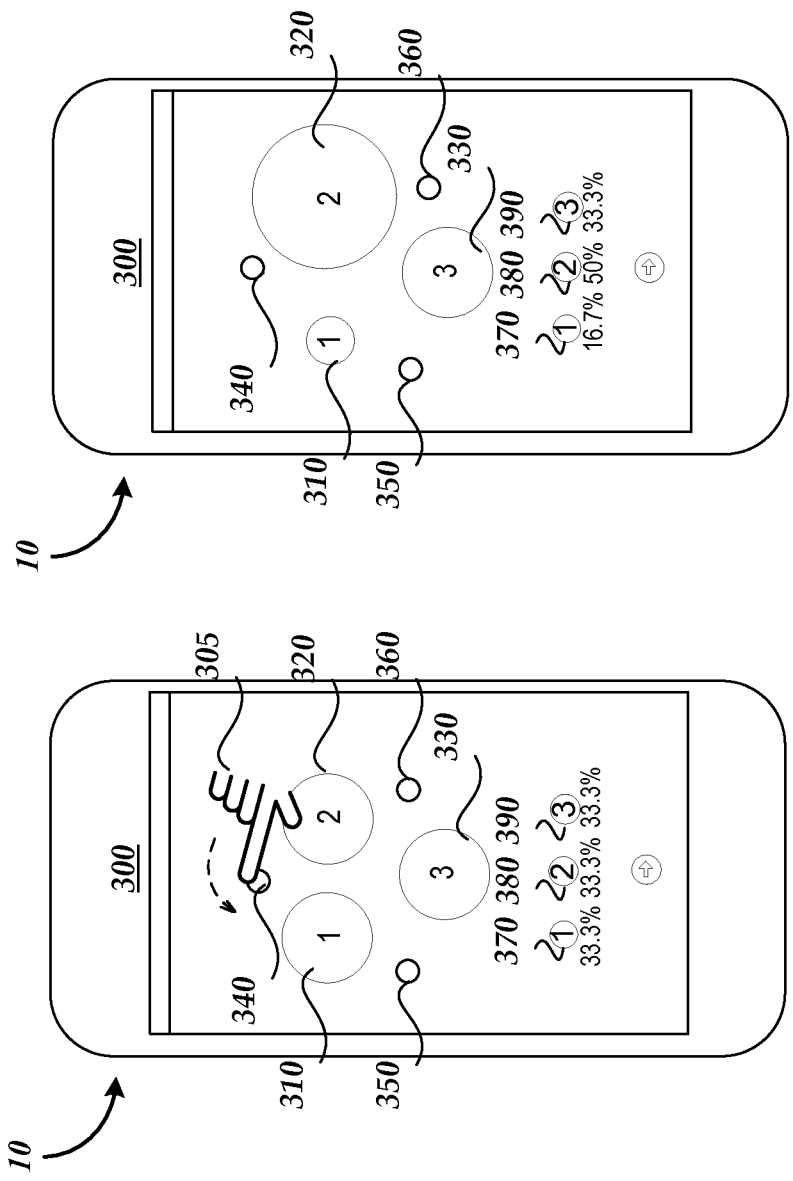
FIG. 3A is a computing device screen display of a user interface which may be utilized for dynamically adjusting ratios of beverages within a mixed beverage, in accordance with an embodiment.
FIG. 3B is a computing device screen display of a user interface which may be utilized for dynamically adjusting ratios of beverages within a mixed beverage, in accordance with an embodiment.

Embodiments are provided for dynamically adjusting ratios of beverages to be mixed and dispensed in the creation of mixed or blended beverages. A selection of beverages may be received from a user interface menu displayed by a computing device. A representation of a mixed beverage comprising the beverage selections may then be displayed according to pre-assigned default ratios. An input may then be received in a user interface to adjust an assigned ratio associated with one or more of the beverage selections. The computing device may then adjust an assigned ratio associated with the one or more beverage selections in response to receiving the input. The computing device may then automatically adjust assigned ratios associated with other beverage selections in the representation of the mixed beverage. The computing device may then display a representation of the mixed beverage with the adjusted ratios in the user interface. These and other features and advantages will be apparent from a reading of the following detailed description and a review of the associated drawings.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Today, software applications enable consumers to create custom beverages by mixing various branded beverages with predetermined flavors in a dispenser. For example, a user may create a custom beverage containing a mix of a cola beverage and a lemon flavor. The created custom beverage may then be immediately dispensed for consumption or saved for later use. Current applications utilized to create custom beverages however, suffer from a number of drawbacks. For example, current applications limit consumers to creating custom beverages using standard drink recipes containing predetermined fixed ingredient amounts or ratios (e.g., a 50/50 ratio of lemon and lime) which are incapable of dynamic adjustment. Some consumers enjoy creating custom beverages by manually dispensing various branded beverages in desired ratios in a single container. The above however, suffers from drawbacks in that consumers have no way of determining the exact ratios needed in order to replicate the creation of a custom beverage (i.e., the consumer is forced to "guestimate" or "eyeball" the beverages as they are dispensed). As a result, consumers attempting to manually create custom beverages may receive a different ratio of branded beverages each time a drink is dispensed thereby leading to decreased drink consistency.

Referring now to the drawings, in which like numerals represent like elements through the several figures, various aspects of the present invention will be described. FIGS. 1A-1C show a computing device screen display of a user interface 100 which may be utilized for selecting beverages for mixing, in accordance with an embodiment. The user interface 100 may be generated by a software application program running on a computing device 10, which may comprise a desktop computing device or a mobile computing device such as a smartphone, a tablet personal computer, a laptop computer, and the like. Turning now to FIG. 1A, the user interface 100 displayed on the computing device 10 includes a menu 110 displaying various beverage options (e.g., beverages B1-B12) which may be selected by a user to create mixed beverages. For example, the computing device 10 may include a user interface (such as a touchscreen) from which a user may select a core beverage brand 120 (identified as "B5") as a part of a custom mixed beverage. In accordance with various embodiments, the menu 110 may display beverages so that they may be readily identified by a consumer. For example, a beverage option may be displayed as an icon showing a brand logo associated with a particular family or "core brand" of beverage products (e.g., cola drinks, root beer, flavored beverages, etc.) or as a beverage product name. Other identifying indicia may also be utilized. It should be understood that the user interface 100 may be capable of displaying hundreds of beverages which a user may view by scrolling through a list on the computing device 10, accessing a sub-menu, or via a combination of the aforementioned methods. Other methods may also be utilized.

The user interface 100 may also include a Menu button 105 and a Favorites button 107. In accordance with an embodiment, the Menu button 105 may be utilized to navigate to other features/menus associated with the software application program utilized to generate the user interface. For example, the Menu button 105 may be utilized to return to a main or "home" menu from which a user may be presented with a number of options including, without limitation: the aforementioned user interface 100 for selecting beverages for mixing; a map option for viewing various locations of customer outlets near a consumer's present location (e.g., the location of dispensers providing a beverage product of interest to a consumer); a profile option for saving information associated with a user such as achievements (e.g., activities earned by a user associated with the purchase or redemption of consumer offers for the purchase of various items), challenges (e.g., contests which may be tied to a consumer reward such as a predetermined number of check-ins at one or more restaurants in order to receive discounted pricing), reward points, activity history, etc.; an offers option for displaying offers associated with a consumer item or service available for purchase; a "mixes" option for viewing various saved beverage mixes created by a consumer; a favorites option for saving a list of a consumer's preferred beverages, and a "connect" option for connecting the consumer to various access portals (e.g., URLs) for obtaining additional information pertaining to a consumer product or sharing information (e.g., favorite beverages or favorite beverage mixes) with others such as through social networking websites. Other options are also possible. The Favorites button 107 may be utilized to display a previously saved list of a consumer's preferred beverages. Consumers may also drag beverages from the menu 110 directly to the Favorites button 107 to save as favorite beverages. A counter may further be used in conjunction with the Favorites button 107 to indicate that a dragged item has been added as a favorite beverage. The user interface 100 also includes a Mix user control 150. In accordance with an embodiment, after selecting a beverage (e.g., the beverage 120), a user may tap and drag a selected beverage icon to the Mix user control 150 to add the beverage to a list 160 of the constituent beverages to include in a mixed beverage as shown in FIG. 1C.

Returning now to FIG. 1A, once a beverage has been selected (e.g., by tapping with finger 125 or via other means) from the menu 110 in the user interface 100, the user interface 100 may then transition to displaying a menu 110a of additional related beverage options as shown in FIG. 1B. The additional related beverage options may include, for example, different flavored versions of a core brand beverage, low or no calorie versions of a core brand beverage, decaffeinated versions of a core brand beverage, etc. It should be understood that additional options as well as combinations of any of the aforementioned options are also possible. In accordance with an embodiment, the additional related beverage options in the menu 110a may be displayed as a carousel surrounding a previously selected "core" beverage (e.g., the beverage B5) from which a related beverage option (e.g., the beverage option 115 (i.e., "B5a") may be selected. The user interface 100 may also display adjoining core beverages from a previous screen display (e.g., the user interface 100 of FIG. 1A) which allows a user to navigate to beverages from the previous screen without having to navigate back through the menu 105. For example, a user may swipe down to navigate up to beverage B2. Similarly, a user may swipe up, left, or right to navigate to beverages B8, B6 or B4, respectively. The user interface 100 of FIG. 1B also includes a Mix user control 150. In accordance with an embodiment, after selecting a related beverage option (e.g., the beverage 115), a user may tap and drag a selected beverage icon to the Mix user control 150 to add the beverage to the list 160 as shown in FIG. 1C. In accordance with an embodiment, the list 160 of FIG. 1C may comprise a tray for displaying selected beverages from the user interfaces 110 and/or 110a for mixing. The Mix user control 150 may then be selected to initiate a "mix mode" for setting the ratios of the selected beverages to be included in a mixed beverage as will be described in further detail below with respect to FIGS. 3A-6B.

FIGS. 2A-2B show a computing device screen display of a user interface 200 which may be utilized for selecting beverages for mixing, in accordance with an alternative embodiment. Turning now to FIG. 2A, the user interface 200 displayed on the computing device 10 includes a menu 220 of beverage options associated with a previously selected core beverage 210 (i.e., beverage "B3"). As discussed above with respect to FIG. 1B, the menu 220 may comprise varieties of core beverage options previously selected by a user. In accordance with an embodiment, the beverage options may be selected by moving a user control 230 (using finger 235 or via other means) along an arc to highlight and select one of the options "a" through "y" shown in the menu 220. For example, the menu 220 of beverage options may comprise a range of beverage flavors beginning with darker colored flavors and progressing toward lighter colored flavors. Other options are also possible. Once one of the options in the menu 220 has been selected, the user may drag the selected option to mix mode user control 240 to add to a list 250 of the constituent beverages to include in a mixed beverage as shown in FIG. 2B. Turning now to FIG. 2B, the user interface 200 includes a user control 260 for navigating to a user interface for dynamically mixing the selected beverages in the list 250. Alternatively, a beverage brand selection may be made via selecting one of options "a" through "y" and then a flavor selection may be made for that brand using user control 230. For example, a beverage brand may be selected via selecting option "c" and then the user control 230 may be moved to select various flavor options associated with brand "c" (Cherry brand "c", Lemon brand "c", etc.).

FIGS. 3A-3B show a computing device screen display of a user interface 300 which may be utilized for dynamically adjusting ratios of beverages within a mixed beverage, in accordance with an embodiment. Turning now to FIG. 3A, the user interface 300, which may be displayed on the computing device 10, may include a default ratio assigned or allocated to the selected beverages contained in the mixed beverage. For example, the user interface 300 shows three selected beverages 310, 320 and 330 having equal ratios (e.g., 33.3%) which are also displayed below indicators 370, 380 and 390 (fewer or more beverages may also be utilized). It should be understood that the default allocations do not necessarily have to be equal. For example, in accordance with an embodiment, different ratios could be utilized which correspond to previously defined mixed beverage recipes from a provider. The user interface 300 also includes user controls 340, 350 and 360 which are associated with each of the displayed beverages. In accordance with an embodiment, each of the user controls 340, 350 and 360 may be rotated in either a clockwise or counterclockwise direction to adjust the default ratios for two adjoining ingredients. For example, rotating the user control 340 in a clockwise direction (e.g., using finger 305 or via other means) may cause the ratio of the beverage 320 to decrease while dynamically increasing the ratio of the beverage 310. Similarly, rotating the user control 350 in a clockwise direction may cause the ratio of the beverage 310 to decrease while dynamically increasing the ratio of the beverage 330. Finally, rotating the user control 360 in a clockwise direction may cause the ratio of the beverage 330 to decrease while dynamically increasing the ratio of the beverage 320. Conversely, rotating the user control 340 in a counter-clockwise direction may cause the ratio of the beverage 320 to increase while dynamically decreasing the ratio of the beverage 310, rotating the user control 350 in a counter-clockwise direction may cause the ratio of the beverage 310 to increase while dynamically decreasing the ratio of the beverage 330 and rotating the user control 360 in a counter-clockwise direction may cause the ratio of the beverage 330 to increase while dynamically decreasing the ratio of the beverage 320. It should be understood that the aforementioned examples are illustrative only and that other rotation schemes may also be utilized.

FIG. 3B shows the user interface 300 after an adjustment of the default ratios has been received by the computing device 10. In particular, the ratio of the beverage 320 has increased to 50% (by virtue of moving the user control 340 in a clockwise direction) with a corresponding dynamic decrease in the ratio of the beverage 310 (as shown by indicators 370, 380 and 390). As discussed above with respect to FIG. 3A, the default ratio of the beverage 330 remains the same since it was not affected by the rotation of the user control 340. As a result of the dynamically adjusted ratios, a new beverage mix may be created. It should be understood that by adjusting ratios in the above-described matter, there are a large number of possible combinations of beverages that may be created.

Figure 4B:
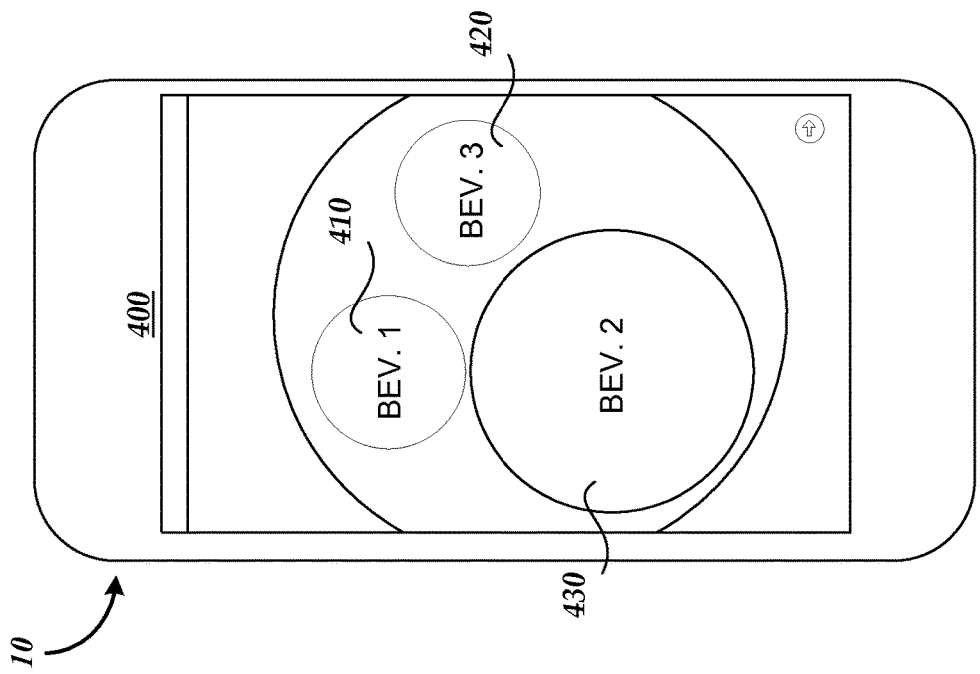
FIG. 4B is a computing device screen display of a user interface which may be utilized for dynamically adjusting ratios of beverages within a mixed beverage, in accordance with an alternative embodiment.
Figure 4A:
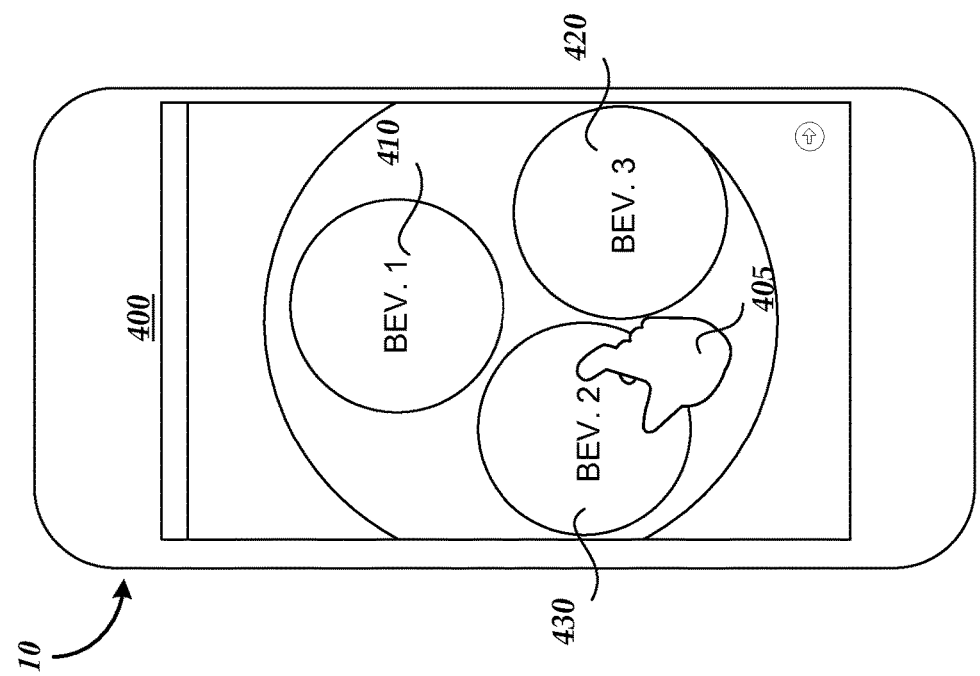
FIG. 4A is a computing device screen display of a user interface which may be utilized for dynamically adjusting ratios of beverages within a mixed beverage, in accordance with an alternative embodiment.

FIGS. 4A-4B show a computing device screen display of a user interface 400 which may be utilized for dynamically adjusting beverage ratios for creating a mixed beverage, in accordance with an alternative embodiment. Turning now to FIG. 4A, the user interface 400, which may be displayed on the computing device 10, may include a default ratio allocation for previously selected beverages. For example, the user interface 400 shows representations of three selected beverages 410, 420 and 430 having equal ratios (as indicated by the diameters of each of the three representations of the aforementioned beverages). Fewer or more beverages may also be utilized. In accordance with an embodiment, the ratios of each of the three beverages 410, 420 and 430 may be increased by dragging, pinching out or zooming out (e.g., using fingers 405 or via other means) the associated representation as shown in FIG. 4B. Conversely, the ratios of each of the three beverages 410, 420 and 430 may be decreased by squeezing, pinching in or zooming in the associated representation. It should be understood that the ratios of the non-selected beverages may also be dynamically increased or decreased to correspond to the aforementioned user adjustments. For example, in response to the increase in the beverage 430, the representations associated with the beverages 410 and 420 have both decreased so that the total ratio of beverages remains at 100%. It should be understood that as a result of the dynamically adjusted ratios, a new beverage mix may be created.

FIGS. 5A-5B show a computing device screen display of a user interface 500 which may be utilized for dynamically adjusting beverage ratios for creating a mixed beverage, in accordance with another alternative embodiment. Turning now to FIG. 5A, the user interface 500, which may be displayed on the computing device 10, may include a default ratio allocation for previously selected beverages. For example, the user interface 500 shows representations of three selected beverages 510, 520 and 530 on a slider bar 505. In accordance with an embodiment, the ratios of each of the three beverages 510, 520 and 530 may be adjusted by sliding their respective representations up or down the slider bar 505 (fewer or more beverages may also be utilized). For example, the ratio of the beverage 510 may be increased by sliding the representation up (e.g., using finger 515 or via other means) on the slider bar 505 in order to increase the ratio from 30% to 35% as shown in FIG. 5B. At the same time, the ratio of the beverage 520 is dynamically decreased while the ratio of the beverage 530 remains fixed. Alternatively, the ratios of beverages 530 and 530 may be dynamically adjusted based on increasing the ratio of the beverage 510. It should be understood that as a result of the dynamically adjusted ratios, a new beverage mix may be created. The user interface 500 also includes a text box 540 which may be utilized to name the newly mixed beverage. A similar text box may be used in conjunction with any of the embodiments described herein to name the mixed beverage.

Figures 6A, 6B:
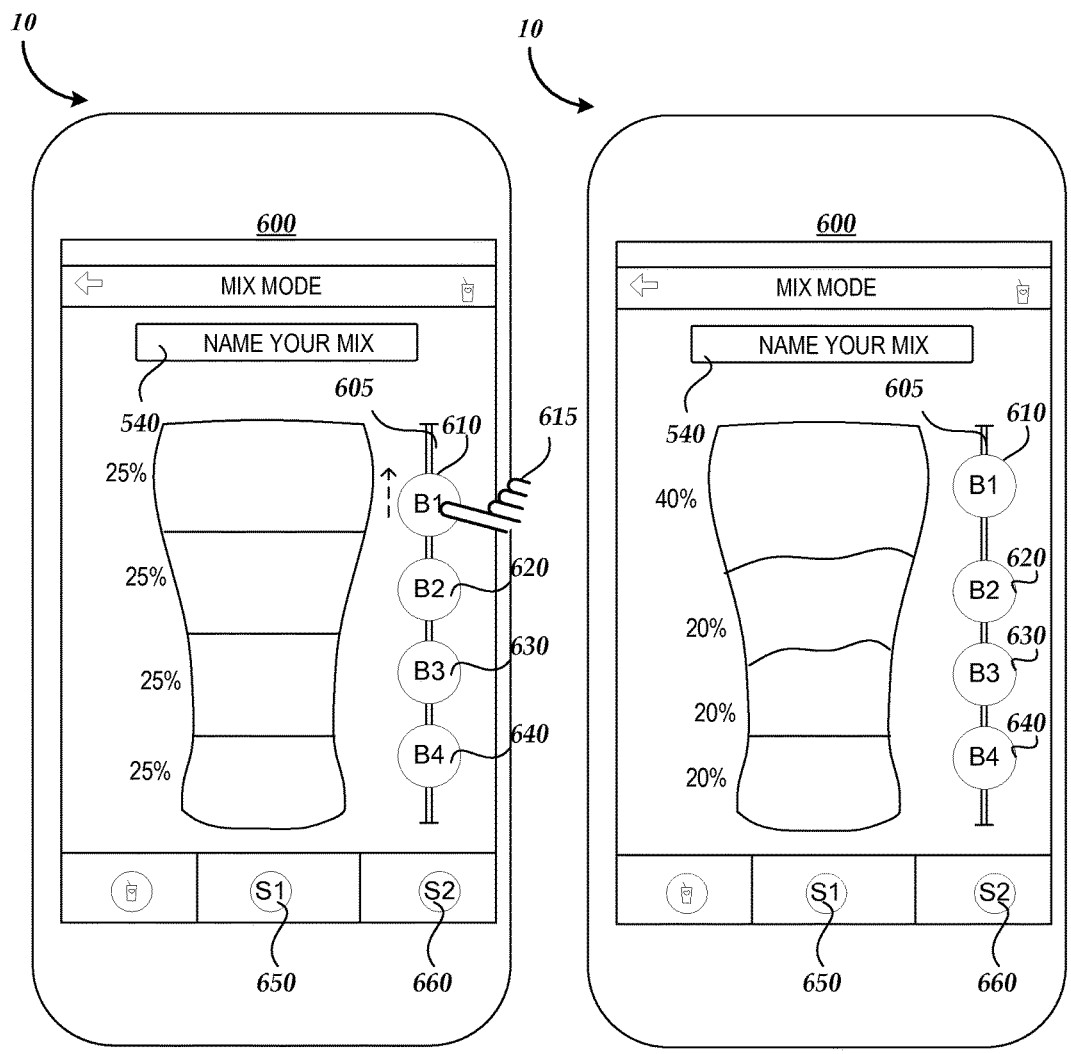
FIG. 6A is a computing device screen display of a user interface which may be utilized for dynamically adjusting ratios of beverages within a mixed beverage, in accordance with yet another alternative embodiment.
FIG. 6B is a computing device screen display of a user interface which may be utilized for dynamically adjusting ratios of beverages within a mixed beverage, in accordance with yet another alternative embodiment.

FIGS. 6A-6B show a computing device screen display of a user interface 600 which may be utilized for dynamically adjusting ratios of beverages within a mixed beverage, in accordance with yet another alternative embodiment. Turning now to FIG. 6A, the user interface 600, which may be displayed on the computing device 10, may include a default ratio allocation for previously selected beverages. For example, the user interface 600 shows representations of four selected beverages 610, 620, 630 and 640 on a slider bar 605 (fewer or more beverages may also be utilized). In accordance with an embodiment, the ratios of each of the beverages 610, 620, 630 and 640 may be adjusted by sliding their respective representations up or down the slider bar 605. For example, the ratio of the beverage 610 may be increased by sliding the representation up (e.g., using finger 615 or via other means) on the slider bar 605 in order to increase the ratio from 25% to 45% as shown in FIG. 6B. At the same time, the ratios of the beverages 620, 630, and 640 are dynamically decreased proportionally down to 20%. It should be understood that as a result of the dynamically adjusted ratios, a new beverage mix may be created. The user interface 600 also includes text box 540 which may be utilized to name the newly mixed beverage as well as user interface buttons 650 and 660 which may be utilized for sharing the beverage mix via social networks via the computing device 10.

FIGS. 7A-7C show a computing device screen display of a user interface 700 which may be utilized for dynamically adjusting ratios of beverages within a mixed beverage, in accordance with yet another alternative embodiment. Turning now to FIG. 7A, the user interface 700, which may be displayed on the computing device 10, may include a default ratio allocation for previously selected beverages. For example, the user interface 700 shows representations of three selected beverages 712, 714 and 716 separated by sliders 720 and 730. In accordance with an embodiment, the ratios of each of the beverages 712, 714 and 716 may be adjusted by moving the slider bars 720 and 730 in an upward or downward direction. For example, the ratio of the beverage 712 may be increased by moving the slider 720 down (e.g., using finger 715 or via other means) in order to increase a default ratio to 50%. At the same time, the ratios of the beverages 714 and 716 are dynamically decreased proportionally down to 25%. The dynamically adjusted ratios of each of the beverages may be shown in information panel 745 as shown in FIG. 7B. The information panel 745 may be accessed by selecting the Beverages tap 740 as shown in FIG. 7A. It should be understood that as a result of the dynamically adjusted ratios, a new beverage mix may be created. The user interface 700 also includes a text box which may be utilized to name the newly mixed beverage as well as an Action tab 750 which may be utilized for saving the newly mixed beverage as a favorite beverage, a favorite mix or sharing via one or more social networks via the computing device 10 (see FIGS. 7A and 7C).

Figure 8:
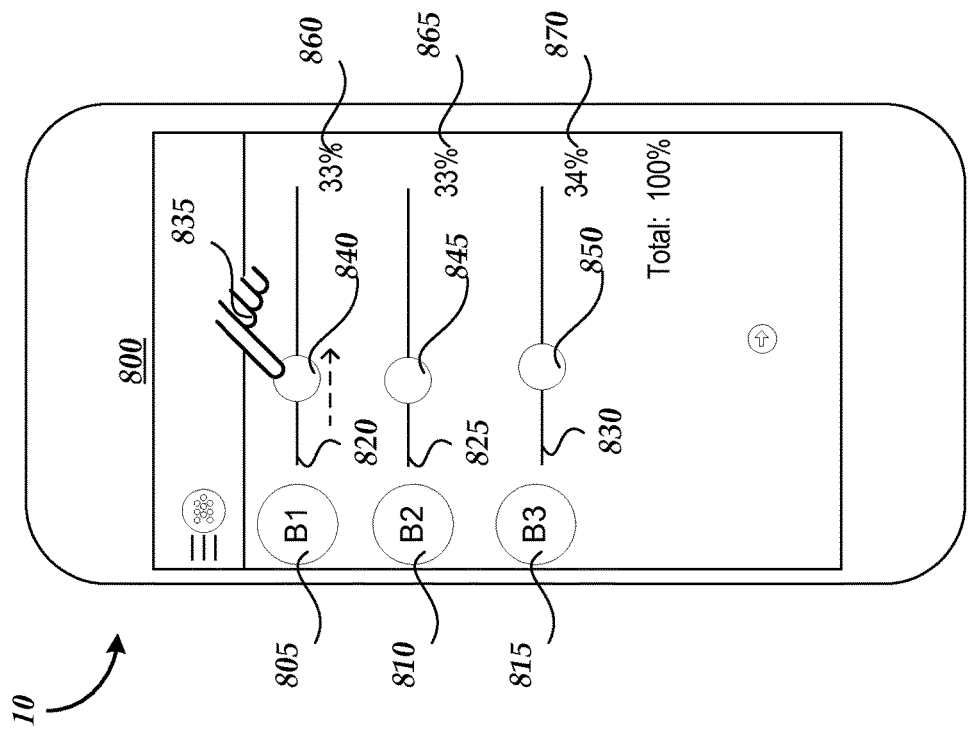
FIG. 8 is a computing device screen display of a user interface which may be utilized for dynamically adjusting ratios of beverages within a mixed beverage, in accordance with yet another alternative embodiment.

FIG. 8 shows a computing device screen display of a user interface 800 which may be utilized for dynamically adjusting beverage ratios for creating a mixed beverage, in accordance with another alternative embodiment. The user interface 800, which may be displayed on the computing device 10, shows a mixed beverage represented by three selected beverages 805, 810 and 815. Each of the beverages 805, 810 and 815 are associated with a respective slider bar 820, 825 and 830. The ratios 860, 865 and 870 of each of the beverages 805, 810 and 815 in the mixed beverage may be adjusted by sliding respective user controls 840, 845 and 850 (e.g., using finger 835 or via other means) along the slider bars 820, 825 and 830. For example, a user may increase the ratio 860 of the beverage 805 (i.e., "B1") from 33% by sliding the user control 840 in the direction of the dashed arrow. At the same time the ratio 860 of the beverage 805 is being increased, the ratios 865 and 870 of the beverages 810 and 815 may be proportionally decreased such that the total percentage of beverages in the mixed beverage equals 100%. It should be understood that as a result of the adjusted ratios, a new mixed beverage may be created.

FIGS. 9A-9C show a computing device screen display of a user interface 900 which may be utilized for saving favorite beverages and favorite mixes created from dynamically adjusting ratios of beverages within mixed beverages, in accordance with an embodiment. Turning now to FIG. 9A, the user interface 900 (which may be displayed on the computing device 10) shows a list of favorite beverages (e.g., top 5) in a carousel configuration (other configurations may also be utilized) including beverages 910, 920 and 930 which have been previously saved by a consumer. The user interface 900 also shows a list 935 of other beverages saved by the consumer as favorite beverages. In accordance with an embodiment, a consumer may add or remove beverages to and from the favorite beverages carousel by dragging the displayed beverage icons.

FIG. 9B shows a list of mixed beverages (e.g., top 3) in a carousel configuration including mixed beverages 940, 950 and 960 with a currently selected mixed beverage (i.e., the mixed beverage 950) being identified by a previously assigned name (e.g., "Jason's Mix"). The user interface 900 also includes a list of other consumer created mixed beverages (such as the mixed beverage 980). In accordance with an embodiment, a consumer may add or remove beverages to and from the favorite mixed beverages carousel by dragging the displayed mixed beverage icons.

FIG. 9C shows further details of as selected mixed beverage from the favorites displayed in the carousel shown in FIG. 9B. For example, upon a selection of the mixed beverage 950 in FIG. 9B, the user interface 900 may further display the corresponding ratios of the beverages (i.e., beverages 970, 980 and 990) which comprise the mixed beverage 950.

FIGS. 10A-10C show a computing device which may be utilized for randomly selecting and mixing beverages for mixing, in accordance with an embodiment. Turning now to FIG. 10A, a user interface 1000 is displayed on the computing device 10 which includes a menu 1010 displaying various beverage options (e.g., beverages B1-B12) which may be selected by a user to create mixed beverages. For example, as discussed above with respect to FIG. 1, the computing device 10 may include a user interface (such as a touchscreen) from which a user may select a core beverage brand as a part of a custom mixed beverage. In accordance with various embodiments, the menu 1005 may display beverages so that they may be readily identified by a consumer. For example, a beverage option may be displayed as an icon showing a brand logo associated with a particular family or "core brand" of beverage products (e.g., cola drinks, root beer, flavored beverages, etc.) or as a beverage product name. Other identifying indicia may also be utilized. It should be understood that the user interface 1000 may be capable of displaying hundreds of beverages which a user may view by scrolling through a list on the computing device 10, accessing a sub-menu, or via a combination of the aforementioned methods. Other methods may also be utilized.

The user interface 1000 may also include a Menu button 1005 and a Favorites button 1007. In accordance with an embodiment, the Menu button 1005 may be utilized to navigate to other features/menus associated with a software application program utilized to generate the user interface. For example, the Menu button 1005 may be utilized to return to a main or "home" menu from which a user may be presented with a number of options including, without limitation: the aforementioned user interface 1000 for selecting beverages for mixing; a map option for viewing various locations of customer outlets near a consumer's present location (e.g., the location of dispensers providing a beverage product of interest to a consumer); a profile option for saving information associated with a user such as achievements (e.g., activities earned by a user associated with the purchase or redemption of consumer offers for the purchase of various items), challenges (e.g., contests which may be tied to a consumer reward such as a predetermined number of check-ins at one or more restaurants in order to receive discounted pricing), reward points, activity history, etc.; an offers option for displaying offers associated with a consumer item or service available for purchase; a "mixes" option for viewing various saved beverage mixes created by a consumer; a favorites option for saving a list of a consumer's preferred beverages, and a "connect" option for connecting the consumer to various access portals (e.g., URLs) for obtaining additional information pertaining to a consumer product or sharing information (e.g., favorite beverages or favorite beverage mixes) with others such as through social networking websites. Other options are also possible. The Favorites button 1007 may be utilized to display a previously saved list of a consumer's preferred beverages. Consumers may also drag beverages from the menu 1010 directly to the Favorites button 1007 to save as favorite beverages. A counter may further be used in conjunction with the Favorites button 1007 to indicate that a dragged item has been added as a favorite beverage.

The user interface 1000 also includes a Mix user control 1050. In accordance with an embodiment, after selecting the Mix user control 1050, a user may shake or agitate the computing device 10 (as shown in FIG. 10B) to initiate a random selection of beverages from the menu 1010 as well as randomly assign beverage ratios to create a mixed beverage as shown in FIG. 10C. In particular, the computing device 10, which may comprise an accelerometer, may be configured to detect an agitation or shaking motion and, in response, automatically initiate the random selection of beverages from the menu 1010 as well as randomly assign beverage ratios to create a mixed beverage. For example, as shown in FIG. 10C, after detecting an agitation of the computing device 10, the user interface 1000 is automatically updated to display randomly selected beverages 1015 ("B3"), 1020 ("B10") and 1025 ("B7") from the menu 1010. The user interface 1000 further includes randomly selected ratios for each of the randomly selected beverages 1015, 1020 and 1025. For example, the user interface 1000 displays ratio indicators 1030 (61%), 1035 (34%) and 1040

(25%) which have been randomly assigned to beverages B10, B7 and B3, respectively and which collectively represent a custom mixed beverage. It should be understood that in some embodiments, the initiation of the random selection of beverages and beverage ratios may not necessarily require the selection of the Mix user control 1050 (discussed above). Instead, the user may simply shake or agitate the computing device 10 whenever the menu 1010 is displayed in the user interface 1000.

FIGS. 11A-11C show a computing device which may be utilized for randomly adjusting ratios of beverages within a mixed beverage, in accordance with an embodiment. Turning now to FIG. 11A, a user interface 1100 may be displayed on the computing device 10 which includes a default ratio assigned or allocated to previously selected beverages contained in a mixed beverage. For example, the user interface 1100 shows two selected beverages 1110 and 1120 equal ratios (i.e., 50%) which are also displayed below indicators 1130 and 1140 (it should be understood that a mixed beverage may also contain additional beverages). As discussed above with respect to FIG. 3, it should be understood that the default allocations do not necessarily have to be equal. Thus, different ratios may be utilized which correspond to previously defined mixed beverage recipes from a provider.

In accordance with an embodiment, the computing device 10, which may comprise an accelerometer, may be tilted about an axis to initiate a random adjustment of ratios assigned to beverages displayed in the user interface 1100. It should be understood that, in accordance with various embodiments, the computing device 10 may be rotated in any of a number of directions or angles with respect to a horizontal axis (i.e., x-axis), a vertical axis (i.e., y-axis) and a depth axis (i.e., z-axis) to initiate a random adjustment of ratios with respect to the beverages 1110 and 1120. For example, as shown in FIG. 11B, the computing device 10 is rotated in a counterclockwise direction with respect to a vertical axis and, as a result, previously assigned beverage ratios associated with the beverages 1110 and 1120 are automatically and randomly adjusted as shown in FIG. 11C.

Figure 12:
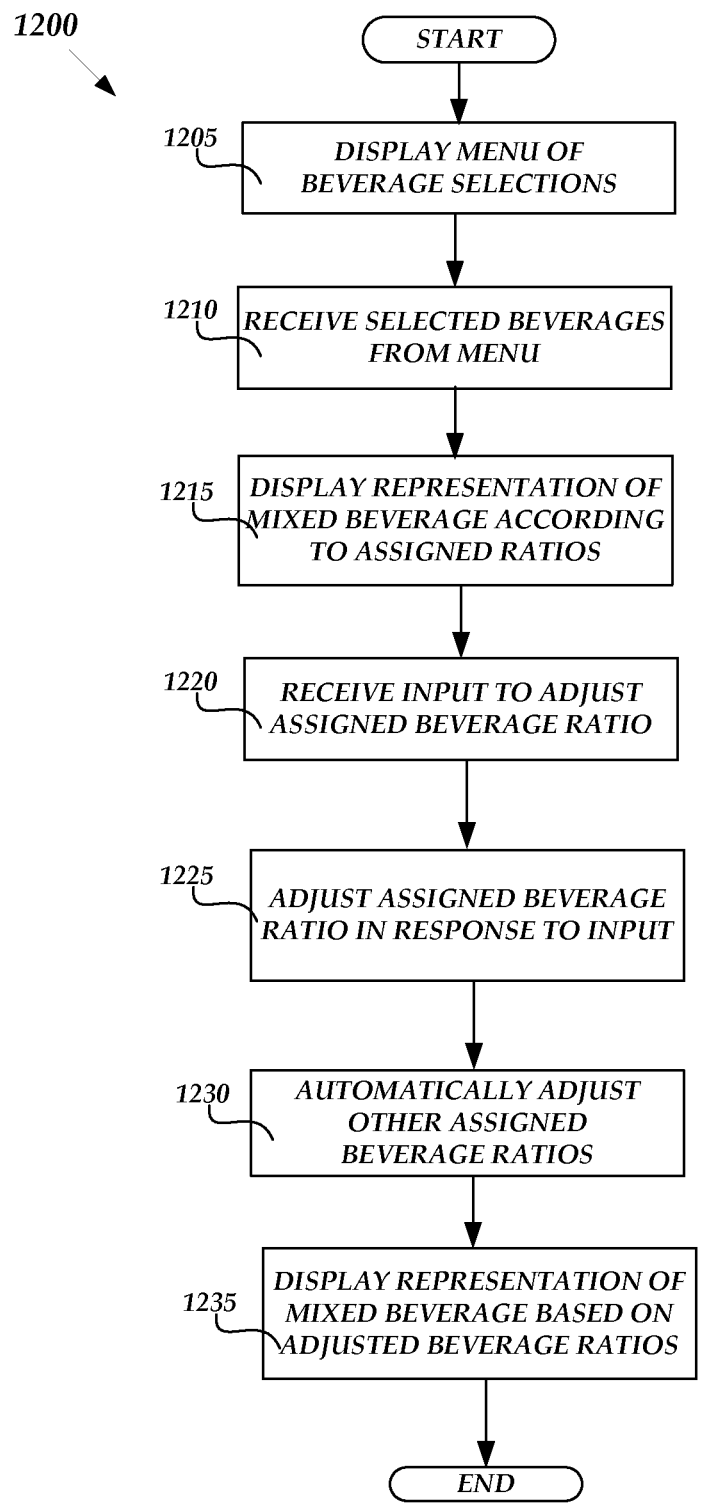
FIG. 12 is a flow diagram illustrating a routine for dynamically adjusting ratios of beverages within a mixed beverage, in accordance with an embodiment.

FIG. 12 is a flow diagram illustrating a routine 1200 for dynamically adjusting ratios for mixing beverages, in accordance with an embodiment. When reading the discussion of the routines presented herein, it should be appreciated that the logical operations of various embodiments of the present invention are implemented (1) as a sequence of computer implemented acts or program modules running on a computing device or system and/or (2) as interconnected machine logical circuits or circuit modules within the computing device or system. The implementation is a matter of choice dependent on the performance requirements of the computing device or system implementing the invention. Accordingly, the logical operations illustrated in FIG. 12 and making up the various embodiments described herein are referred to variously as operations, structural devices, acts or modules. It will be recognized by one skilled in the art that these operations, structural devices, acts and modules may be implemented in software, in firmware, in hardware, in special purpose digital logical, and any combination thereof without deviating from the spirit and scope of the present invention as recited within the claims set forth herein.

The routine 1200 begins at operation 1205, where an application executing on the computing device 10, may display a menu of beverage selections for mixing into a custom beverage.

From operation 1205, the routine 1200 continues to operation 1210, where the application executing on the computing device 10, may receive selected beverages from the menu displayed at operation 1205. In accordance with various embodiments, the beverages may be selected in response to a user tapping and dragging a selected beverage (as described above with respect to FIGS. 1A-1C), moving a user control along an arc to highlight and select one of a plurality of displayed beverage options (as described above with respect to FIG. 2A-2B) or by agitating the mobile computing device 10 to randomly select beverage options from a menu (as described above with respect to FIGS. 10A-10C).

From operation 1210, the routine 1200 continues to operation 1215, where the application executing on the computing device 10, may display a representation of a mixed beverage according to assigned (e.g., default) ratios. In accordance with an embodiment, the assigned ratios may be equal for each of the selected beverages comprising the mix.

From operation 1215, the routine 1200 continues to operation 1220, where the application executing on the computing device 10, may receive an input to adjust assigned beverage ratios for the mixed beverage. In accordance with various embodiments, the input may comprise a selection of a user control to adjust the assigned beverage ratios according to a desired preference of a user (as described above with respect to FIG. 3-9) or a tilting of the mobile computing device 10 by a user to rotate the mobile computing device 10 about an axis so as to randomly adjust the assigned beverage ratios.

From operation 1220, the routine 1200 continues to operation 1225, where the application executing on the computing device 10, may adjust the assigned beverage ratio. In accordance with an embodiment, the assigned ratio may be adjusted by dragging a user control in at least one of a clockwise direction and a counter-clockwise direction. In accordance with another embodiment, the assigned ratio may be adjusted by zooming in a user control to decrease the assigned ratio. In accordance with another embodiment, the assigned ratio may be adjusted by zooming out a user control to increase the assigned ratio. In accordance with another embodiment, the assigned ratio may be adjusted by sliding a user control (e.g., an icon) along a slider to adjust the assigned ratio. In accordance with another embodiment, the assigned ratio may be adjusted by agitating or rotating the computing device 10.

From operation 1225, the routine 1200 continues to operation 1230, where the application executing on the computing device 10, may automatically (i.e., dynamically) adjust other assigned beverage ratios in response to the adjustment made to the assigned beverage ratio at operation 1225. It should be understood that in adjusting the other beverage ratios, the application may optionally be configured to maintain an assigned ratio for one of the other beverage selections comprising the mixed beverage.

From operation 1230, the routine 1200 continues to operation 1235, where the application executing on the computing device 10, may display a representation of a mixed beverage based on the adjusted ratios. From operation 1235, the routine 1200 then ends.

It should be understood that the various above-described embodiments may be utilized by consumers to create and dispense custom beverage recipes. A software application for creating custom beverage recipes may be downloaded from a digital application distribution platform to a consumer device. Once the software application has been downloaded, the consumer may follow prompts and other directions for creating a custom beverage. The custom beverage may comprise a combination of core brands and flavors according to desired ratios or percentages set by the consumer. Once a custom beverage recipe has been created, a consumer may save it within the software application. It should be understood that a consumer may create and save multiple custom beverage recipes within the software application. The software application may also include functionality which allows the consumer to share custom beverage recipes via social media websites. Other functionality which may be provided includes the awarding of "reward points" in connection with the sharing of recipes. The sharing functionality may be performed automatically by the software application or, alternatively, manually by the consumer. Additionally, after a recipe has been saved, the software application may enable a consumer to wirelessly transfer the recipe to a dispenser via a handshaking procedure. The handshake may be accomplished via any of a number of connection methods including, but not limited to, Bluetooth wireless technology, NFC, Long Polling, Wi-Fi, etc. During the handshake, the consumer's data is transferred to the dispenser. The data may include the consumer's custom recipes as well as consumer profile information. The data may be stored and transmitted to a dispenser provider immediately or during nightly data transfers. Once the dispenser has received the consumer's information a custom screen may be displayed with a personalized greeting (e.g., "Welcome, Nadia!"). The personalized greeting allows the dispenser vendor to provide consumers with a personal experience when interacting with their dispensers. The dispenser may also be configured to display icons for each of a consumer's saved custom beverage recipes. The consumer may then select a desired recipe and dispense the beverage from the dispenser. Reward points may be also awarded upon dispensing. In addition to providing icons for custom beverage recipes, the dispenser display may also include an icon that allows the consumer to navigate to a standard main display for the dispenser. For example, the consumer may want to connect with the dispenser to earn reward points but may not want his or her custom beverage. It should be understood that reward points may be awarded throughout the different stages. For example, points may be awarded for downloading the software application, creating a first custom recipe with increasing points for subsequent recipes, connecting to a dispenser, sharing the custom recipe via social media websites, sharing the dispensing of the beverage via social media, etc.

Figure 13:
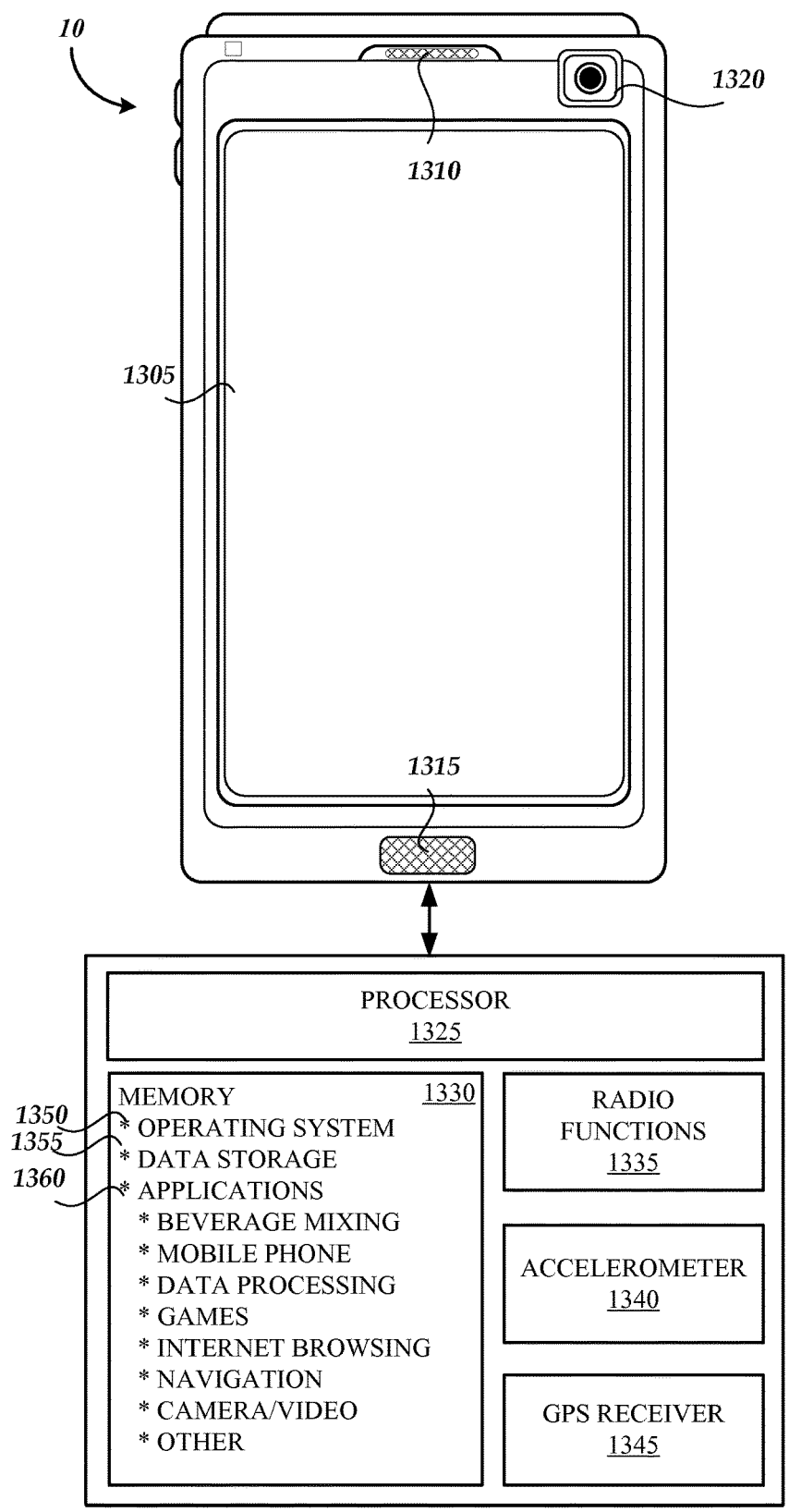
FIG. 13 is a simplified block diagram of a computing device with which various embodiments may be practiced.

FIG. 13 is a simplified block diagram of a computing device with which various embodiments may be practiced. In a basic configuration, the computing device 10 is a handheld computer having both input elements and output elements. Input elements may include touch screen display 1305 which allows the user to enter information into the mobile computing device 10, microphone 1315 and camera 1320. In alternative embodiments, the computing device 10 may incorporate additional input elements such as microphone 1315 and a physical keypad (not shown). A "soft" keypad (not shown) may also be generated on the touch screen display 1305. The touch screen display 1305 on the computing device 10 may also comprise an output element which can display a graphical user interface (GUI). Other output elements include speaker 1310. Additionally, the computing device 10 may incorporate a vibration module (not shown), which causes the computing device 10 to vibrate to notify the user of an event. In yet another embodiment, the computing device 10 may incorporate a headphone jack (not shown) for providing another means of providing output signals.

The computing device 10 may also comprise a number of components for implementing some embodiments. The components may include processor 1325, memory 1330, radio functions 1335 and accelerometer 1340 and GPS receiver 1345. The memory 1330 may be utilized for storing an operating system 1350 and include data storage 1355. The memory 1330 may also include a number of applications 1360 including, but not limited to, a beverage mixing application, mobile phone application, a data processing application, games, an Internet browser, navigation, a camera/video application and other applications. The radio functions 1335 may support wireless communications via NFC, BLUETOOTH wireless technology, Wi-Fi or other wireless technologies. It should be understood that the radio functions 1335 may also be utilized to connect to the Internet (or other types of networks) as well as to remote computing systems.

It should be understood that various embodiments may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information (such as computer readable instructions, data structures, program modules, or other data) in hardware. The memory 1330 in the computing device 10 is an example of computer storage media (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 10. Any such computer storage media may also be part of the computing device 10. Computer storage media does not include a carrier wave or other propagated or modulated data signal.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Various embodiments are described above with reference to block diagrams and/or operational illustrations of methods, systems, and computer program products. The operations/acts noted in the blocks may be skipped or occur out of the order as shown in any flow diagram. For example, two or more blocks shown in succession may in fact be executed substantially concurrently or the blocks may sometimes be executed in the reverse order, depending upon the functionality/acts involved.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of dynamically adjusting ratios for mixing beverages, comprising: receiving at a computing device a plurality of beverage selections of core brand beverages from a user interacting with the computing device; displaying on the computing device a representation of a mixed beverage comprising the plurality of beverage selections according to assigned ratios; receiving, from the user via the computing device, a rotational input to adjust an assigned ratio associated with at least one beverage selection from the plurality of beverage selections comprising receiving information from a user control located between a first beverage selection and a second beverage selection from the plurality of beverage selections; adjusting in the computing device the assigned ratio associated with the at least one beverage selection in response to receiving the input; automatically adjusting in the computing device an assigned ratio associated with at least one other beverage selection from the plurality of beverage selections; displaying, on the computing device, the representation of the mixed beverage comprising the plurality of beverage selections based on the adjusted assigned ratios for the at least one beverage selection and the at least one other beverage selection; and transferring wirelessly a recipe associated with the mixed beverage comprising the plurality of beverage selections based on the adjusted assigned ratios from the computing device to a beverage dispensing device such that the mixed beverage can be created and automatically dispensed by the beverage dispensing device.

2. The method of claim 1, wherein displaying on the computing device a representation of the mixed beverage comprising the plurality of beverage selections according to assigned ratios comprises displaying the representation of the mixed beverage having equal ratios of each of the plurality of beverage selections.

3. The method of claim 1, wherein receiving, wherein the user control is configured to be rotated in a first direction to decrease a ratio of the first beverage selection while dynamically increasing a ratio of the second beverage selection in the mixed beverage.

4. The method of claim 3, wherein the user control is further configured to be rotated in a second direction to increase a ratio of the first beverage selection while dynamically decreasing a ratio of the second beverage selection in the mixed beverage.

5. The method of claim 1, wherein receiving at a computing device a plurality of beverage selections of core brand beverages from a user interacting with the computing device comprises receiving at the computing device three or more beverage selections of core brand beverages from the user interacting with the computing device.

6. The method of claim 1, wherein receiving, from the user via the computing device, an input to adjust an assigned ratio associated with at least one beverage selection from the plurality of beverage selections comprises enabling the user to slide one or more of a plurality of icons along an axis of a single slider, wherein each icon in the plurality of icons is uniquely associated with a beverage from the plurality of beverage selections, and further wherein sliding a first icon from the plurality of icons in a first direction along the axis of the single slider increases a ratio of a beverage associated with the first icon in the mixed beverage and dynamically decreases ratios of other beverages associated with other icons in the plurality of icons in the mixed beverage.

7. The method of claim 1, wherein automatically adjusting, by the computing device, an assigned ratio associated with at least one other beverage selection from the plurality of beverage selections, is further operative to maintain another assigned ratio for another beverage selection from the plurality of beverage selections.

8. The method of claim 1, wherein receiving a plurality of beverage selections from a user via the computing device comprises receiving a plurality of randomly selected beverage selections in response to one or more of: shaking of the computing device; tilting of the computing device.

9. The method of claim 1, wherein receiving, from the user via the computing device, an input to adjust the assigned ratio associated with at least one beverage selection from the plurality of beverage selections comprises receiving the input to adjust the assigned ratio in response to one or more of: shaking of the computing device; tilting of the computing device.

10. The method of claim 1, wherein receiving a plurality of beverage selections from a user via a computing device comprises allowing a user to drag one or more beverage selections into a mix user control displayed on a user interface on the computing device.

11. The method of claim 1, further comprising allowing the user to adjust a flavor of one or more of the core brand beverages in the plurality of beverage selections.

12. The method of claim 1, wherein transferring wirelessly a recipe associated with the mixed beverage comprises wirelessly transferring the recipe to the beverage dispensing device via a handshaking procedure.

13. A mobile computing device for dynamically adjusting ratios for mixing beverages, comprising: a memory for storing executable program code; and a processor, functionally coupled to the memory, the processor being responsive to computer-executable instructions contained in the program code and operative to: receive, from a user of the mobile computing device, a plurality of beverage selections of core brand beverages from a user interface menu; display a representation of a mixed beverage comprising the plurality of beverage selections according to assigned ratios; receive, from the user of the mobile computing device, a rotational input to adjust an assigned ratio associated with at least one beverage selection from the plurality of beverage selections comprising receiving information from a user control located between a first beverage selection and a second beverage selection from the plurality of beverage selections; adjust the assigned ratio associated with the at least one beverage selection in response to receiving the input; automatically adjust an assigned ratio associated with at least one other beverage selection from the plurality of beverage selections; display the representation of the mixed beverage comprising the plurality of beverage selections based on the adjusted assigned ratios for the at least one beverage selection and the at least one other beverage selection; and wirelessly transfer a recipe associated with the mixed beverage comprising the plurality of beverage selections based on the adjusted assigned ratios to a beverage dispensing device via a handshaking procedure such that the mixed beverage can be created and automatically dispensed by the beverage dispensing device.

14. The mobile computing device of claim 13, wherein the processor, in displaying a representation of the mixed beverage comprising the plurality of beverage selections according to assigned ratios, is operative to display the representation of the mixed beverage having equal ratios of each of the plurality of beverage selections.

15. The mobile computing device of claim 13, wherein the user control is configured to be rotated in a first direction to decrease a ratio of the first beverage selection while dynamically increasing a ratio of the second beverage selection in the mixed beverage.

16. The mobile computing device of claim 13, wherein the processor, in receiving, from a user of the mobile computing device, a plurality of beverage selections of core brand beverages from a user interface menu is operative to receive three or more beverage selections of core brand beverages from the user of the mobile computing device.

17. The mobile computing device of claim 13, wherein the processor, in adjusting the assigned ratio associated with the at least one beverage selection in response to receiving the input, is operative to zoom out a user control to increase the assigned ratio associated with the at least one beverage selection.

18. The mobile computing device of claim 13, wherein the processor, in receiving, from the user of the mobile computing device, an input to adjust an assigned ratio associated with at least one beverage selection from the plurality of beverage selections, is operative to display a plurality of icons along a common axis of a single slider, wherein each icon in the plurality of icons is uniquely associated with a beverage from the plurality of beverage selections, and further wherein sliding a first icon from the plurality of icons in a first direction along the common axis of the single slider relative to other icons from the plurality of icons on the slider increases a ratio of a beverage associated with the first icon in the mixed beverage, while sliding the first icon in a second direction along the common axis of the single slider decreases a ratio of the beverage associated with the first icon in the mixed beverage.

19. The mobile computing device of claim 13, wherein the processor, in automatically adjusting an assigned ratio associated with at least one other beverage selection from the plurality of beverage selections, is further operative to maintain another assigned ratio for another beverage selection from the plurality of beverage selections.

20. The mobile computing device of claim 13, wherein the processor, in receiving a plurality of beverage selections from a user interface menu is operative to receive an input on the computing device to receive a plurality of randomly selected beverage selections from the user interface menu.

21. The mobile computing device of claim 20, wherein the processor, in displaying a representation of a mixed beverage comprising the plurality of beverage selections according to assigned ratios, is operative to: in response to receiving the input, randomly assign ratios to the randomly selected beverage selections; and display the representation of the mixed beverage according to the randomly assigned ratios.

22. The mobile computing device of claim 20, wherein the processor, in receiving an input on the computing device to receive a plurality of randomly selected beverage selections from the user interface menu is operative to receive an agitation input on the computing device.

23. The mobile computing device of claim 13, wherein the processor, in receiving an input on the computing device to wirelessly transfer a recipe associated with the mixed beverage comprising the plurality of beverage selections based on the adjusted assigned ratios to a beverage dispensing device via a handshaking procedure such that the mixed beverage can be created and dispensed by the beverage dispensing device is operative to facilitate the handshaking procedure using one or more of: Bluetooth wireless technology; near field communication technology; long polling technology; Wi-Fi technology.

24. The mobile computing device of claim 13, wherein the processor, in adjusting the assigned ratio associated with the at least one beverage selection in response to receiving the input, is operative to: receive a tilt input to rotate the computing device about an axis; and randomly adjust the assigned ratio associated with the at least one beverage selection in response to receiving the tilt input.

25. A computer-readable storage medium storing computer executable instructions which, when executed by a mobile computing device, cause the mobile computing device to perform a method of dynamically adjusting ratios for mixing beverages, the method comprising: displaying a menu of core brand beverages in a user interface; receiving a plurality of beverage selections from the core brand beverages from the menu; displaying a representation of a mixed beverage comprising the plurality of beverage selections according to assigned ratios; receiving a rotational input to adjust an assigned ratio associated with at least one beverage selection from the plurality of beverage selections comprising receiving information from a user control located between a first beverage selection and a second beverage selection from the plurality of beverage selections; adjusting the assigned ratio associated with the at least one beverage selection in response to receiving the input; automatically adjusting, by the computing device, an assigned ratio associated with at least one other beverage selection from the plurality of beverage selections; displaying, in a user interface, the representation of the mixed beverage comprising the plurality of beverage selections based on the adjusted assigned ratios for the at least one beverage selection and the at least one other beverage selection; and wirelessly transferring a recipe associated with the mixed beverage comprising the plurality of beverage selections based on the adjusted assigned ratios from the mobile computing device to a beverage dispensing device using one or more handshaking procedures such that the mixed beverage can be created and automatically dispensed at the beverage dispenser.

26. The computer-readable storage medium of claim 25, wherein displaying a representation of the mixed beverage comprising the plurality of beverage selections according to assigned ratios comprises displaying the representation of the mixed beverage having equal ratios of each of the plurality of beverage selections.

27. The computer-readable storage medium of claim 25, wherein receiving a plurality of beverage selections from the core brand beverages from the menu comprises receiving three or more beverage selections of core brand beverages from the menu.

28. The computer-readable storage medium of claim 25, wherein the user control is configured to be rotated in a first direction to decrease a ratio of the first beverage selection while dynamically increasing a ratio of the second beverage selection in the mixed beverage.

29. The computer-readable storage medium of claim 25, wherein receiving an input to adjust an assigned ratio associated with at least one beverage selection from the plurality of beverage selections comprises displaying a plurality of icons along a single axis of a slider, wherein each icon in the plurality of icons is uniquely associated with a beverage from the plurality of beverage selections, and further wherein sliding a first icon from the plurality of icons in a first direction along the axis of the slider increases a ratio of a beverage associated with the first icon in the mixed beverage.

30. The computer-readable storage medium of claim 25, further comprising computer executable instructions which, when executed by a computing device, cause the computing device to perform actions comprising: presenting an option to enable sharing of a recipe associated with the mixed beverage comprising the plurality of beverage selections based on the adjusted assigned ratios via one or more social media websites.

31. The computer-readable storage medium of claim 25, wherein receiving a plurality of beverage selections from the core brand beverages from the menu comprises receiving an input on the computing device to receive a plurality of randomly selected beverage selections from the menu.

32. The computer-readable storage medium of claim 31, wherein displaying a representation of a mixed beverage comprising the plurality of beverage selections according to assigned ratios comprises: in response to receiving the input, randomly assigning ratios to the randomly selected beverage selections; and displaying the representation of the mixed beverage according to the randomly assigned ratios.

33. The computer-readable storage medium of claim 31, wherein receiving an input on the computing device to receive a plurality of randomly selected beverage selections from the menu comprises receiving an agitation input on the computing device.

34. The computer-readable storage medium of claim 25, wherein wirelessly transferring the recipe comprises facilitating the one or more handshaking procedures using one or more of: Bluetooth wireless technology; near field communication technology; long polling technology; Wi-Fi technology.

35. The computer-readable storage medium of claim 25, wherein adjusting the assigned ratio associated with the at least one beverage selection in response to receiving the input comprises: receiving a tilt input to rotate the computing device about an axis; and randomly adjusting the assigned ratio associated with the at least one beverage selection in response to receiving the tilt input.

* * * * *